United States Patent
Kao

(10) Patent No.: US 11,462,951 B1
(45) Date of Patent: Oct. 4, 2022

(54) METHOD FOR DISTINGUISHING METAL OBJECTS FROM HEATING CUP AND WIRELESS CHARGING DEVICE USING THE SAME

(71) Applicant: Peter Kao, Baldwin Park, CA (US)

(72) Inventor: Peter Kao, Baldwin Park, CA (US)

( * ) Notice: Subject to any disclaimer, the term of this patent is extended or adjusted under 35 U.S.C. 154(b) by 0 days.

(21) Appl. No.: 17/405,855

(22) Filed: Aug. 18, 2021

(51) Int. Cl.
*A47J 36/24* (2006.01)
*H02J 50/60* (2016.01)
*H02J 50/10* (2016.01)

(52) U.S. Cl.
CPC ........... *H02J 50/60* (2016.02); *A47J 36/2472* (2013.01); *H02J 50/10* (2016.02)

(58) Field of Classification Search
CPC ................ A47J 36/2444; A47J 36/2461; A47J 36/2466; A47J 36/2472; A47J 36/2483; A47J 36/26; A47J 41/0038; A47J 41/005; H02J 50/10; H02J 50/60; H05B 1/0269; H05B 6/02; H05B 6/06; H05B 6/062; H05B 6/10; H05B 6/101; H05B 6/108; H05B 6/12; H05B 6/1209; H05B 6/1236
See application file for complete search history.

(56) References Cited

U.S. PATENT DOCUMENTS

| | | | |
|---|---|---|---|
| 9,525,209 B2* | 12/2016 | Tanabe | H02J 7/02 |
| 2015/0171633 A1* | 6/2015 | Nakano | B60L 53/36 |
| | | | 307/104 |
| 2016/0336760 A1* | 11/2016 | Yamamoto | H02J 50/12 |
| 2017/0117755 A1* | 4/2017 | Muratov | H02J 50/60 |
| 2017/0117756 A1* | 4/2017 | Muratov | H02J 50/60 |
| 2017/0149287 A1* | 5/2017 | Nakano | H02J 50/60 |
| 2019/0131826 A1* | 5/2019 | Park | H02J 50/12 |
| 2019/0148983 A1* | 5/2019 | Kozakai | H02J 50/80 |
| | | | 320/108 |
| 2020/0204009 A1* | 6/2020 | Park | H02J 50/20 |
| 2021/0159730 A1* | 5/2021 | Moon | H04B 5/0031 |
| 2021/0257863 A1* | 8/2021 | Sato | H04B 5/0081 |
| 2021/0274604 A1* | 9/2021 | Lee | H02J 50/90 |
| 2021/0281088 A1* | 9/2021 | Feng | H02J 7/02 |

* cited by examiner

*Primary Examiner* — Levi Gannon
(74) *Attorney, Agent, or Firm* — Tommy SF Wang; Wang IP Law Group, P.C.

(57) ABSTRACT

A method for distinguishing metal objects from a heating cup and a wireless charging device using the method are disclosed. The wireless charging device includes a housing, a power unit, a power transmitter, a current measuring unit, a Q factor measuring unit, a controller, and a temperature detector. The wireless charging device can distinguish metal objects from a heating cup by both current in the power transmitter and the Q factor of the power transmitter. If the heating cup is confirmed, a higher power will be provided to a metal heating layer of the heating cup to heat the liquid in the heating cup; otherwise, a lower power will be provided to charge general electronic devices having a power receiving element.

19 Claims, 4 Drawing Sheets providing a wireless charging device having a power transmitter and a plurality of testing metal objects each having a unique outward appearance or a unique size (S01)

heating the testing metal objects one by one by the power transmitter and respectively recording a first range of Q factor of the power transmitter and a first range of current in the power transmitter after heating one metal object for at least 2 seconds for each testing metal object (S02)

heating a heating cup having a metal heating layer near a bottom thereof by the power transmitter and recording a second range of Q factor of the power transmitter and a second range of current in the power transmitter after heating the heating cup for at least 2 seconds (S03)

finding out a third range of Q factor which is within the second range of Q factor and has the least number of overlaps with the first ranges of Q factor (S04)

finding out a third range of current which is within the second range of current and has the least number of overlaps with the first ranges of current (S05)

determining a heated object which is the heating cup if a measured Q factor of the power transmitter falls in the third range of Q factor and a measured current of the power transmitter falls in the third range of current (S06)

Fig. 2

| No. of Testing Metal Object or Heating Cup | Dimension (Thickness, Diameter) (mm) | First / Second Range of Q Factor (Dimensionless) | First / Second Range of Current (mA) |
|---|---|---|---|
| 1 | (1, 15) | 50 – 80 | 10 – 20 |
| 2 | (1, 20) | 48 – 78 | 9 – 19 |
| 3 | (1, 25) | 46 – 76 | 9 – 18 |
| 4 | (1, 30) | 44 – 74 | 8 – 18 |
| 5 | (1, 35) | 42 – 72 | 8 – 17 |
| 6 | (1, 40) | 40 – 70 | 8 – 16 |
| 7 | (1, 45) | 38 – 68 | 7 – 16 |
| 8 | (1, 50) | 38 – 66 | 7 – 15 |
| 9 | (1, 55) | 36 – 64 | 7 – 14 |
| 10 | (1, 60) | 36 – 62 | 7 – 13 |
| Heating Cup | -- | 60 – 80 | 8 – 17 |

Fig. 3

| providing a wireless charging device having a power transmitter and a plurality of testing metal objects each having a unique outward appearance or a unique size (S01) |
|---|
| heating the testing metal objects one by one by the power transmitter and respectively recording a first range of Q factor of the power transmitter and a first range of current in the power transmitter after heating one metal object for at least 2 seconds for each testing metal object (S02) |
| heating a heating cup having a metal heating layer near a bottom thereof by the power transmitter and recording a second range of Q factor of the power transmitter and a second range of current in the power transmitter after heating the heating cup for at least 2 seconds (S03) |
| finding out a third range of Q factor which is within the second range of Q factor and without overlap with any of the first ranges of Q factor (S04') |
| finding out a third range of current which is within the second range of current and has the least number of overlaps with the first ranges of current (S05) |
| determining a heated object which is the heating cup if a measured Q factor of the power transmitter falls in the third range of Q factor, or the measured Q factor of the power transmitter falls in the third range of Q factor and a measured current of the power transmitter falls in the third range of current (S06') |

Fig. 4

METHOD FOR DISTINGUISHING METAL OBJECTS FROM HEATING CUP AND WIRELESS CHARGING DEVICE USING THE SAME

FIELD OF THE INVENTION

The present invention relates to a method for detecting metal objects and a device using the method. More particularly, the present invention relates to a method for distinguishing metal objects from a heating cup and a wireless charging device using the method to charge specific objects, such as a heating cup containing metal powder on the bottom.

BACKGROUND OF THE INVENTION

Wireless charging is a mature technology widely applied on many aspects in daily life. From mobile phones to vehicles, more and more objects driven by electricity are now charged over air and get rid of the trouble of tangled wires. There are some specifications of wireless charging, for example, Wireless Power Consortium (WPC) and Air-Fuel Alliance. Although the principles of wireless charging are different, they both offer a basic structure for all charger manufacturers to design their products, as well as the electronic equipment manufacturer.

In addition to electronic products, many wireless charger manufacturers have also found that wireless charging technology can be applied to heating cups. A common way is to add a thin film rich in metal powder to the bottom of a cup, and heat is generated through electromagnetic interaction with the metal powder. Generally, the output power of a wireless charger for charging mobile phones is 10 W or 15 W. However, if the wireless charger is used for a heating cup, the output power must reach 24 W. The output power is determined based on what kind of object is detected. If a stainless-steel ruler is unintentionally placed upon the wireless charger, it will be treated as the heating cup and got heated. People will get hurt as well. Therefore, the wireless charger needs precise calculation to determine whether it is a foreign body in order to avoid the danger of heating other metal objects by mistake.

For most wireless chargers, a convenient method to determine charging objects is by measuring a quality factor (Q factor) in a transmitter of the charger. If the Q factor is in a preset range for a heating cup, then the output power can be adjusted to meet the requirement of the heating cup. Otherwise, the charger provides power as usual. However, there is a problem. If an object which results in a closer Q factor as that of the charger, it will still be heated.

Therefore, an innovative method for distinguishing metal objects from a heating cup to settle the problem is required. In addition, a wireless charging device using the method to charge the heating cup is also expected.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

According to an aspect of the present invention, a method for distinguishing metal objects from a heating cup comprises the steps of: a) providing a wireless charging device having a power transmitter and a plurality of testing metal objects each having a unique outward appearance or a unique size; b) heating the testing metal objects one by one by the power transmitter and respectively recording a first range of quality factor (Q factor) of the power transmitter and a first range of current in the power transmitter after heating one metal object for at least 2 seconds for each testing metal object; c) heating a heating cup having a metal heating layer near a bottom thereof by the power transmitter and recording a second range of Q factor of the power transmitter and a second range of current in the power transmitter after heating the heating cup for at least 2 seconds; d) finding out a third range of Q factor which is within the second range of Q factor and has the least number of overlaps with the first ranges of Q factor; e) finding out a third range of current which is within the second range of current and has the least number of overlaps with the first ranges of current; and f) determining a heated object which is the heating cup if a measured Q factor of the power transmitter falls in the third range of Q factor and a measured current of the power transmitter falls in the third range of current.

Preferably, the testing metal objects may be made of iron and have a thickness of 1 mm.

Preferably, a sectional shape of the testing metal objects may be round.

Preferably, the number of the testing metal objects is 10 and diameters of the testing metal objects are 15 mm, 20 mm, 25 mm, 30 mm, 35 mm, 40 mm, 45 mm, 50 mm, 55 mm and 60 mm, respectively.

Preferably, the testing metal objects may be a metal ruler, a metal spoon, a coin, a metal scissors, a metal key, and a pen with a metal part.

According to another aspect of the present invention, a method for distinguishing metal objects from a heating cup comprises the steps of: a) providing a wireless charging device having a power transmitter and a plurality of testing metal objects each having a unique outward appearance or a unique size; b) heating the testing metal objects one by one by the power transmitter and respectively recording a first range of Q factor of the power transmitter and a first range of current in the power transmitter after heating one metal object for at least 2 seconds for each testing metal object; c) heating a heating cup having a metal heating layer near a bottom thereof by the power transmitter and recording a second range of Q factor of the power transmitter and a second range of current in the power transmitter after heating the heating cup for at least 2 seconds; d) finding out a third range of Q factor which is within the second range of Q factor and without overlap with any of the first ranges of Q factor; e) finding out a third range of current which is within the second range of current and has the least number of overlaps with the first ranges of current; and f) determining a heated object which is the heating cup if a measured Q factor of the power transmitter falls in the third range of Q factor, or the measured Q factor of the power transmitter falls in the third range of Q factor and a measured current of the power transmitter falls in the third range of current.

Preferably, the testing metal objects may be made of iron and have a thickness of 1 mm.

Preferably, a sectional shape of the testing metal objects may be round.

Preferably, the number of the testing metal objects is 10 and diameters of the testing metal objects are 15 mm, 20 mm, 25 mm, 30 mm, 35 mm, 40 mm, 45 mm, 50 mm, 55 mm and 60 mm, respectively.

Preferably, the testing metal objects may be a metal ruler, a metal spoon, a coin, a metal scissors, a metal key, and a pen with a metal part.

According to another aspect of the present invention, a wireless charging device comprises: a power unit, providing direct current power; a power transmitter, electrically connected with the power unit, converting the direct current power into electromagnetic energy and outputting the electromagnetic energy; a current measuring unit, electrically connected between the power unit and the power transmitter, measuring current therebetween; a Q factor measuring unit, electrically connected with the power transmitter, measuring a Q factor of the power transmitter constantly; and a controller, electrically connected to the power transmitter, the current measuring unit, the Q factor measuring unit, and the power unit, controlling the power output of the power transmitter based on a measured current from the current measuring unit and a measured Q factor from the Q factor measuring unit.

Preferably, the controller controls the power transmitter to output power higher than 24 W for heating a heating cup if the measured Q factor of the power transmitter falls in a third range of Q factor and the measured current of the power transmitter falls in the a range of current, or otherwise output power in a range between 10 W and 15 W. The third range of Q factor and the range of current are found by the method for distinguishing metal objects from a heating cup according to the first method mentioned above. The testing metal objects are made of iron and have a thickness of 1 mm, a sectional shape of the testing metal objects is round, and the number of the testing metal objects is 10 and diameters of the testing metal objects are 15 mm, 20 mm, 25 mm, 30 mm, 35 mm, 40 mm, 45 mm, 50 mm, 55 mm and 60 mm, respectively.

Preferably, the controller controls the power transmitter to output power higher than 24 W for heating a heating cup if the measured Q factor of the power transmitter falls in the third range of Q factor, or the measured Q factor of the power transmitter falls in the third range of Q factor and the measured current of the power transmitter falls in the third range of current, or otherwise output power in a range between 10 W and 15 W. The third range of Q factor and the range of current are found by the method for distinguishing metal objects from a heating cup according to the second method mentioned above. The testing metal objects are made of iron and have a thickness of 1 mm, a sectional shape of the testing metal objects is round, and the number of the testing metal objects is 10 and diameters of the testing metal objects are 15 mm, 20 mm, 25 mm, 30 mm, 35 mm, 40 mm, 45 mm, 50 mm, 55 mm and 60 mm, respectively.

Preferably, the wireless charging device further comprises a temperature detector, electrically connected to the controller, detecting the temperature of the power transmitter so that when the temperature of the power transmitter is higher than a warning value, the controller stops operation of the power transmitter. When the current measuring unit detects the current in the power transmitter is higher than an upper limit, the controller stops power supply from the power unit to the power transmitter.

Preferably, the power transmitter further comprises: an inverter, converts the direct current power into to alternating current power with a frequency in a range of 200-245 kHz; and a transmission coil, electrically connected with the inverter, converting the alternating current power into electromagnetic energy and outputting the electromagnetic energy.

BRIEF DESCRIPTION OF THE DRAWINGS

FIG. 2 is a flow chart of a method for distinguishing metal objects from a heating cup according to the present invention.

FIG. 3 is a table lists related data in determining a third range of Q factor and a third range of current.

FIG. 4 is a flow chart of another method for distinguishing metal objects from a heating cup according to the present invention.

DETAILED DESCRIPTION OF THE PREFERRED EMBODIMENTS

Figure 1:
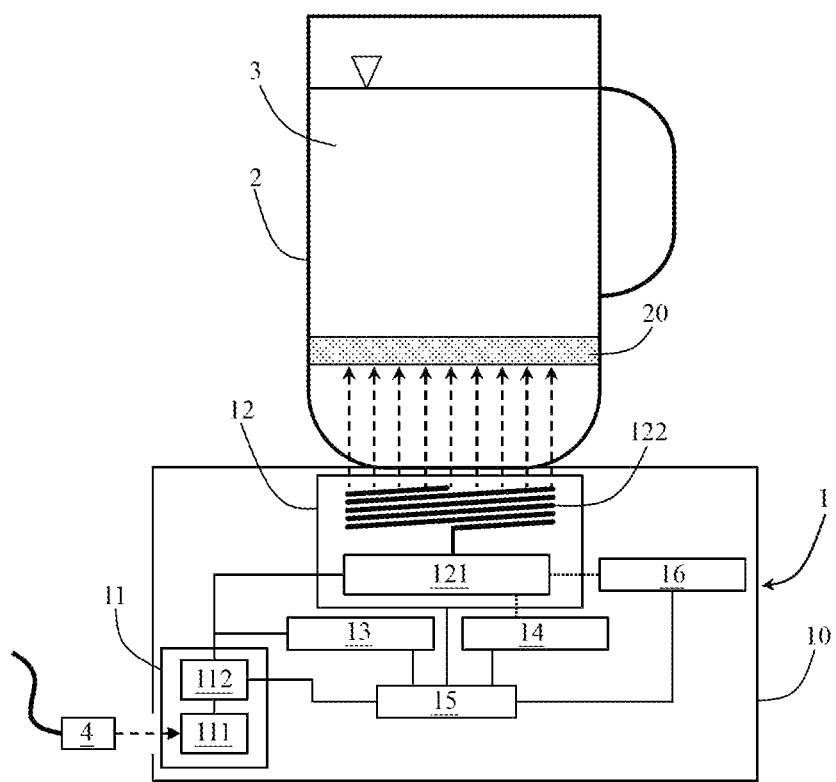
FIG. 1 is a schematic diagram of a wireless charging device according to the present invention.

The present invention will now be described more specifically with reference to the following embodiments.

Please refer to FIG. 1. It is a schematic diagram of a wireless charging device 1 of an embodiment according to the present invention. The wireless charging device 1 includes a housing 10, a power unit 11, a power transmitter 12, a current measuring unit 13, a quality factor (Q factor) measuring unit 14, a controller 15 and a temperature detector 16. These technical components will be described in detail below.

The housing 10 is the outermost structure of the wireless charging device 1. It contains and protects all other technical components inside. Furthermore, the housing 10 also forms a platform on an upper surface to hold an electronic device, e.g. a smart phone, that is under charging. According to the present invention, the housing 10 can hold a heating cup 2 for charging as well. The heating cup 2 contains water 3 or other drink which needs to be heated up. There is a metal heating layer 20 on a bottom of the heating cup 2. The metal heating layer 20 is made of metal powder. When the wireless charging device 1 turns on to work, a magnetic field and the electromagnetic energy generated by the wireless charging device 1 will interact with the metal heating layer 20. Thus, the metal heating layer 20 is heated. Heat from the metal heating layer 20 will be conducted to the water 3 and increase the temperature of the water 3.

The power unit 11 provides direct current power. In detail, the power unit 11 has child elements of an external power interface 111 and a power management circuit 112. The external power interface 111 is a terminal set complied with some power transmission specifications. For example, the external power interface 111 may be a USB type C socket, connecting to a USB type C connector 4 to receive direct current power from a transformer (not shown). The power management circuit 112 is electrically connected with the external power interface 111, adjusting the voltage and current of the power from the external power interface 111 to any technical components in the wireless charging device 1 which needs direct current power to operate. The power management circuit 112 is also electrically connected to the controller 15 and under the control of the controller 15.

The power transmitter 12 is electrically connected with the power unit 11. It converts the direct current power from the power unit 11 into electromagnetic energy and outputs the electromagnetic energy to wirelessly charge the electronic device or the heating cup 2. The structure of the power transmitter 12 comprises an inverter 121 and a transmission coil 122. The inverter 121 can convert the direct current power into to alternating current power. Preferably, the alternating current power has a frequency in a range of 200-245 kHz. The transmission coil 122 is electrically connected with the inverter 121 and converts the alternating current power into electromagnetic energy and output the electromagnetic energy. Type of the transmission coil 122 is not limited by the present invention. It can be a hollow coil or planar coil. It can also include a core in the center. The shape and the number of turns of the transmission coil 122 are not restricted. The power transmitter 12 may conform to qi specification.

The current measuring unit 13 is electrically connected between the power unit 11 and the power transmitter 12. The current measuring unit 13 measures the current between the power unit 11 and the power transmitter 12. It is also the current flows in the power transmitter 12. The current measuring unit 13 can be a current sensor to calculate the current by sampling other physical values. The current measuring unit 13 has another function. When the current measuring unit 13 detects the current in the power transmitter 12 is higher than an upper limit, e.g. IA (set according to the requirement of the design of the wireless charging device 1), the controller 15 will stop power supply from the power unit 11 to the power transmitter 12. It can prevent the power transmitter 12 from overheat and broken. The Q factor measuring unit 14 is electrically connected with the power transmitter 12 and measures a Q factor of the power transmitter 12 constantly. The Q factor measuring unit 14 is a chip which is available in the market.

The controller 15 is electrically connected to the power unit 11, the power transmitter 12, the current measuring unit 13, the Q factor measuring unit 14, and the temperature detector 16. Its main job is to control the power output of the power transmitter 12 based on a measured current from the current measuring unit 13 and a measured Q factor from the Q factor measuring unit 14. Details will be provided with the description of a method for distinguishing metal objects from a heating cup disclosed by the present invention.

The temperature detector 16 can detect the temperature of the power transmitter 12 so that when the temperature of the power transmitter 12 is higher than a warning value, for example 100° C., the controller 15 stops operation of the power transmitter 12. This is a protection mechanism. The power transmitter 12, or even the whole wireless charging device 1, is protected when the power transmitter 12 gets too hot to avoid fire. Another function is to control the temperature of the water in the heating cup. When the temperature of the power transmitter 12 is higher than 90 degrees, power is stopped deliver, and when the temperature drops to 80 degrees, power starts to deliver the power again, so that it will work in such a cycle to reach the goal of keeping a constant temperature of the heating cup.

The controller 15 controls the power transmitter 12 to output power higher than 24 W for heating a heating cup if the measured Q factor of the power transmitter 12 falls in a third range of Q factor and the measured current of the power transmitter falls in a range of current, or otherwise output power in a range between 10 W and 15 W for other electronic devices with power receiving element. When a mobile phone or another receiving coil is placed on the housing 10, the Q factor will not change, so that it is possible to stably charge the mobile phone or supply power to another receiving coil.

The third range of Q factor and the range of current are about how a heating cup is determined before it get heated and can be available from the method for distinguishing metal objects from a heating cup disclosed by the present invention. Please refer to FIG. 2 and FIG. 3. FIG. 2 is a flow chart of the method and FIG. 3 is a table lists related data in determining the third range of Q factor and the third range of current.

In FIG. 2, a first step of the method is providing the wireless charging device 1 having the power transmitter 12 and a number of testing metal objects each having a unique outward appearance or a unique size (S01). The testing metal objects simulate some metal products in daily life, e.g. a metal ruler, which may be placed on the wireless charging device 1 under charging by mistake. If the difference between these products and the heating cup can be found, the wireless charging device 1 can automatically charge the heating with correct power. In an example, 10 testing metal objects are applied and numbered from 1 to 10 as shown in FIG. 2. The testing metal objects are made of iron and have a thickness of 1 mm. A sectional shape of the testing metal objects is round. Diameters of the testing metal objects from No. 1 to No. 10 are 15 mm, 20 mm, 25 mm, 30 mm, 35 mm, 40 mm, 45 mm, 50 mm, 55 mm and 60 mm, respectively. It should be noticed that the shape and ingredients of the testing metal objects are not limited but can be changed for specific wireless charging devices. As well, the number of testing metal objects is not limited to 10, it can be any number. The more the testing metal objects are used, the more precise the conclusion can be. Moreover, the testing metal objects can be "actual things". For example, a metal ruler, a metal spoon, a coin, a metal scissors, a metal key and a pen with a metal part are used as the testing metal objects.

A second step of the method is heating the testing metal objects one by one by the power transmitter, 12 and respectively recording a first range of Q factor of the power transmitter 12 and a first range of current in the power transmitter 12 after heating one metal object for at least 2 seconds for each testing metal object (S02). The first range of Q factor of the power transmitter 12 is the range of measured (continuous sampled) Q factor in a short time, e.g. 2 seconds. It can be seen in FIG. 3 that the first ranges of Q factor of the testing metal objects from No. 1 to No. 10 are 50-80, 48-78, 46-76, 44-74, 42-72, 40-70, 38-68, 38-66, 36-64 and 36-62, respectively. The first range of current in the power transmitter 12 is the range of measured (continuous sampled) current which should be the results after 2 seconds. This is because the current will be more stable after charging begins. The first range of current of the testing metal objects from No. 1 to No. 10 in mA are 10-20, 9-19, 9-18, 8-18, 8-17, 8-16, 7-16, 7-15, 7-14 and 7-13, respectively. It should be emphasized that the data in FIG. 3 are explanatory. In order to have a comprehensive understanding, all numbers are idealized and simplified to be integerized. Real data will have the portion below the decimal point and magnitude may be different from group of testing metal objects to other group of testing metal objects.

A third step of the method is heating the heating cup 2 having the metal heating layer 20 near a bottom thereof by the power transmitter 12 and recording a second range of Q factor of the power transmitter 12 and a second range of current in the power transmitter 12 after heating the heating cup 2 for at least 2 seconds (S03). Obviously, this step is to collect control data from the heating cup 2. However, the heating cups of the same model produced by the same company will have different characteristics in different batches. Even in the same batch, there will be slight differences between any two heating cups. Therefore, in order to make the results more accurate, more heating cups 2 should be used to determine the second range of Q factor and the second range of current. For example, 20 heating cups 2 are used to process the step S03. A wider second range of Q factor and a wider second range of current can be obtained by using the maximum and minimum in the data from all heating cups 2. In this example, the second range of Q factor is 60-80 and the second range of current is 8-7 (mA).

A fourth step of the method is finding out the third range of Q factor (as the one mentioned above) which is within the second range of Q factor and has the least number of overlaps with the first ranges of Q factor (S04). At most, the third range of Q factor is 60-80. If the second range of Q factor and all first ranges of Q factor are cut and segmented by 2, FIG. 3 shows that the second range of Q factor overlaps with 10 first ranges of Q factor of the 10 testing metal objects (from No. 1 to No. 10) in 60-62, the second range of Q factor overlaps with 9 first ranges of Q factor of the 10 testing metal objects (from No. 1 to No. 9) in 62-64, . . . , the second range of Q factor overlaps with 2 first ranges of Q factor of the 10 testing metal objects (from No. 1 to No. 2) in 76-78, and the second range of Q factor overlaps with only one first range of Q factor of the 10 testing metal objects (No. 1) in 78-80. Obviously, the third range of Q factor should be 78-80.

Similarly, a fifth step of the method is finding out the third range of current (as the one mentioned above) which is within the second range of current and has the least number of overlaps with the first ranges of current (S05). From FIG. 3, the third range of current is 8-9 and 15-16 (mA) with 6 overlaps. The third range of current or the third range of Q factor is not required to be continuous according to the present invention.

The last step of the method is determining a heated object which is the heating cup 2 if a measured Q factor of the power transmitter 12 falls in the third range of Q factor and a measured current of the power transmitter 12 falls in the third range of current (S06). If a heated object has a measured Q factor of the power transmitter 12 of 79, it might be the heating cup 2. If the heated object has a measured current of the power transmitter 12 of 15.5 mA, it can be determined to be the heating cup 2. Otherwise, if the measured current of the power transmitter 12 is 13 mA, the heated object can not be determined to be the heating cup 2. In the present embodiment, the controller 15 controls the power transmitter 12 to output power higher than 24 W for heating the heating cup 2 if the measured Q factor of the power transmitter 12 falls in the third range of Q factor, or otherwise output power in a range between 10 W and 15 W for other electronic devices.

If the second range of Q factor of the power transmitter 12 in FIG. 3 changes to 60-82, it is obvious that the third range of Q factor is definitely 80-82 since no first range of Q factor of the 10 testing metal objects has such value. According to the present invention, a heated object can be directly determined to be the heating cup if a measured Q factor of the power transmitter 12 falls in the third range of Q factor. Steps of the method for distinguishing metal objects from a heating cup should be changed accordingly.

Please see FIG. 4. It is a flow chart of another method for distinguishing metal objects from a heating cup according to the present invention. In this embodiment, the steps of the method are different from that in the previous embodiment in step S04 and S06. In this embodiment, a new fourth step is finding out a third range of Q factor which is within the second range of Q factor and without overlap with any of the first ranges of Q factor (S04'). As the example shown above, 80-82 is the third range of Q. A last step in the method is determining a heated object which is the heating cup if a measured Q factor of the power transmitter 12 falls in the third range of Q factor, or the measured Q factor of the power transmitter 12 falls in the third range of Q factor and a measured current of the power transmitter 12 falls in the third range of current (S06'). In addition to direct determination of the heating cup 2 based on the measured Q factor of the power transmitter 12, according to the present invention, an alternative way is to consider the third range of current as well as the third range of Q factor. Therefore, the controller can control the power transmitter 12 to output power higher than 24 W for heating a heating cup 2 if the measured Q factor of the power transmitter 12 falls in the third range of Q factor, or the measured Q factor of the power transmitter 12 falls in the third range of Q factor and the measured current of the power transmitter 12 falls in the third range of current. Otherwise, judge whether there is a mobile phone or receiving coil on it before output power in a range between 10 W and 15 W.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for distinguishing metal objects from a heating cup, comprising the steps of:
   a) providing a wireless charging device having a power transmitter and a plurality of testing metal objects each having a unique outward appearance or a unique size;
   b) heating the testing metal objects one by one by the power transmitter and respectively recording a first range of quality factor (Q factor) of the power transmitter and a first range of current in the power transmitter after heating one metal object for at least 2 seconds for each testing metal object;
   c) heating a heating cup having a metal heating layer near a bottom thereof by the power transmitter and recording a second range of Q factor of the power transmitter and a second range of current in the power transmitter after heating the heating cup for at least 2 seconds;
   d) finding out a third range of Q factor which is within the second range of Q factor and has the least number of overlaps with the first ranges of Q factor;
   e) finding out a third range of current which is within the second range of current and has the least number of overlaps with the first ranges of current; and
   f) determining a heated object which is the heating cup if a measured Q factor of the power transmitter falls in the third range of Q factor and a measured current of the power transmitter falls in the third range of current.

2. The method according to claim 1, wherein the testing metal objects are made of iron and have a thickness of 1 mm.

3. The method according to claim 2, wherein a sectional shape of the testing metal objects is round.

4. The method according to claim 3, wherein the number of the testing metal objects is 10 and diameters of the testing metal objects are 15 mm, 20 mm, 25 mm, 30 mm, 35 mm, 40 mm, 45 mm, 50 mm, 55 mm and 60 mm, respectively.

5. The method according to claim 1, wherein the testing metal objects are a metal ruler, a metal spoon, a coin, a metal scissors, a metal key, and a pen with a metal part.

6. A method for distinguishing metal objects from a heating cup, comprising the steps of:

a) providing a wireless charging device having a power transmitter and a plurality of testing metal objects each having a unique outward appearance or a unique size;
b) heating the testing metal objects one by one by the power transmitter and respectively recording a first range of Q factor of the power transmitter and a first range of current in the power transmitter after heating one metal object for at least 2 seconds for each testing metal object;
c) heating a heating cup having a metal heating layer near a bottom thereof by the power transmitter and recording a second range of Q factor of the power transmitter and a second range of current in the power transmitter after heating the heating cup for at least 2 seconds;
d) finding out a third range of Q factor which is within the second range of Q factor and without overlap with any of the first ranges of Q factor;
e) finding out a third range of current which is within the second range of current and has the least number of overlaps with the first ranges of current; and
f) determining a heated object which is the heating cup if a measured Q factor of the power transmitter falls in the third range of Q factor, or the measured Q factor of the power transmitter falls in the third range of Q factor and a measured current of the power transmitter falls in the third range of current.

7. The method according to claim 6, wherein the testing metal objects are made of iron and have a thickness of 1 mm.

8. The method according to claim 7, wherein a sectional shape of the testing metal objects is round.

9. The method according to claim 8, wherein the number of the testing metal objects is 10 and diameters of the testing metal objects are 15 mm, 20 mm, 25 mm, 30 mm, 35 mm, 40 mm, 45 mm, 50 mm, 55 mm and 60 mm, respectively.

10. The method according to claim 6, wherein the testing metal objects are a metal ruler, a metal spoon, a coin, a metal scissors, a metal key, and a pen with a metal part.

11. A wireless charging device, comprising:
a power unit, providing direct current power;
a power transmitter, electrically connected with the power unit, converting the direct current power into electromagnetic energy and outputting the electromagnetic energy;
a current measuring unit, electrically connected between the power unit and the power transmitter, measuring current therebetween;
a Q factor measuring unit, electrically connected with the power transmitter, measuring a Q factor of the power transmitter constantly; and
a controller, electrically connected to the power transmitter, the current measuring unit, the Q factor measuring unit, and the power unit, controlling the power output of the power transmitter based on a measured current from the current measuring unit and a measured Q factor from the Q factor measuring unit,
wherein the controller controls the power transmitter to output power higher than 24 W for heating a heating cup if the measured Q factor of the power transmitter falls in a third range of Q factor and the measured current of the power transmitter falls in a range of current, or otherwise output power in a range between 10 W and 15 W.

12. The wireless charging device according to claim 11, wherein the third range of Q factor and the range of current are found by a method for distinguishing metal objects from a heating cup, comprising the steps of:

a) providing a wireless charging device having a power transmitter and a plurality of testing metal objects each having a unique outward appearance or a unique size;
b) heating the testing metal objects one by one by the power transmitter and respectively recording a first range of quality factor (Q factor) of the power transmitter and a first range of current in the power transmitter after heating one metal object for at least 2 seconds for each testing metal object;
c) heating a heating cup having a metal heating layer near a bottom thereof by the power transmitter and recording a second range of Q factor of the power transmitter and a second range of current in the power transmitter after heating the heating cup for at least 2 seconds;
d) finding out a third range of Q factor which is within the second range of Q factor and has the least number of overlaps with the first ranges of Q factor;
e) finding out a third range of current which is within the second range of current and has the least number of overlaps with the first ranges of current; and
f) determining a heated object which is the heating cup if a measured Q factor of the power transmitter falls in the third range of Q factor and a measured current of the power transmitter falls in the third range of current.

13. The wireless charging device according to claim 12, wherein the testing metal objects are made of iron and have a thickness of 1 mm, a sectional shape of the testing metal objects is round, and the number of the testing metal objects is 10 and diameters of the testing metal objects are 15 mm, 20 mm, 25 mm, 30 mm, 35 mm, 40 mm, 45 mm, 50 mm, 55 mm and 60 mm, respectively.

14. The wireless charging device according to claim 11, wherein the controller controls the power transmitter to output power higher than 24 W for heating a heating cup if the measured Q factor of the power transmitter falls in the third range of Q factor, or the measured Q factor of the power transmitter falls in the third range of Q factor and the measured current of the power transmitter falls in the third range of current, or otherwise output power in a range between 10 W and 15 W.

15. The wireless charging device according to claim 14, wherein the third range of Q factor and the range of current are found by a method for distinguishing metal objects from a heating cup, comprising the steps of:
a) providing a wireless charging device having a power transmitter and a plurality of testing metal objects each having a unique outward appearance or a unique size;
b) heating the testing metal objects one by one by the power transmitter and respectively recording a first range of Q factor of the power transmitter and a first range of current in the Dower transmitter after heating one metal object for at least 2 seconds for each testing metal object;
c) heating a heating cup having a metal heating layer near a bottom thereof by the Dower transmitter and recording a second range of Q factor of the Dower transmitter and a second range of current in the power transmitter after heating the heating cup for at least 2 seconds;
d) finding out a third range of Q factor which is within the second range of Q factor and without overlap with any of the first ranges of Q factor;
e) finding out a third range of current which is within the second range of current and has the least number of overlaps with the first ranges of current; and
f) determining a heated object which is the heating cup if a measured Q factor of the Dower transmitter falls in the third range of Q factor, or the measured Q factor of the power transmitter falls in the third range of Q factor and a measured current of the power transmitter falls in the third range of current.

16. The wireless charging device according to claim 15, wherein the testing metal objects are made of iron and have a thickness of 1 mm, a sectional shape of the testing metal objects is round, and the number of the testing metal objects is 10 and diameters of the testing metal objects are 15 mm, 20 mm, 25 mm, 30 mm, 35 mm, 40 mm, 45 mm, 50 mm, 55 mm and 60 mm, respectively.

17. The wireless charging device according to claim 11, further comprising a temperature detector, electrically connected to the controller, detecting the temperature of the power transmitter so that when the temperature of the power transmitter is higher than a warning value, the controller stops operation of the power transmitter.

18. The wireless charging device according to claim 11, wherein when the current measuring unit detects the current in the power transmitter is higher than an upper limit, the controller stops power supply from the power unit to the power transmitter.

19. The wireless charging device according to claim 11, wherein the power transmitter further comprises:
  an inverter, converts the direct current power into to alternating current power with a frequency in a range of 200-245 kHz; and
  a transmission coil, electrically connected with the inverter, converting the alternating current power into electromagnetic energy and outputting the electromagnetic energy.

* * * * *